(12) United States Patent
Scherer et al.

(10) Patent No.: US 8,230,881 B2
(45) Date of Patent: Jul. 31, 2012

(54) VALVE

(75) Inventors: Georg Scherer, Kirchheim (DE); Helmut Mang, Memmingen (DE)

(73) Assignee: Firma SVM Schultz Verwaltungs-GmbH & Co. KG, Memmingen (DE)

( * ) Notice: Subject to any disclaimer, the term of this patent is extended or adjusted under 35 U.S.C. 154(b) by 972 days.

(21) Appl. No.: 12/219,209

(22) Filed: Jul. 17, 2008

(65) Prior Publication Data
US 2009/0025803 A1 Jan. 29, 2009

(30) Foreign Application Priority Data
Jul. 26, 2007 (DE) .......................... 10 2007 035 472

(51) Int. Cl.
*F16K 11/07* (2006.01)
(52) U.S. Cl. .............................. 137/596.17; 137/625.26
(58) Field of Classification Search ............ 137/625.26, 137/596.17; 251/129.15
See application file for complete search history.

(56) References Cited

U.S. PATENT DOCUMENTS

| | | | | |
|---|---|---|---|---|
| 4,304,258 A | * | 12/1981 | Mitchell ................... | 137/596.17 |
| 4,783,049 A | * | 11/1988 | Northman et al. ........ | 251/129.14 |
| 5,135,027 A | * | 8/1992 | Miki et al. ................ | 137/596.17 |
| 5,333,945 A | * | 8/1994 | Volz et al. ................. | 303/119.2 |
| 5,651,391 A | * | 7/1997 | Connolly et al. ......... | 137/625.65 |
| 5,738,142 A | * | 4/1998 | Eike et al. ................. | 137/596.17 |
| 5,766,469 A | * | 6/1998 | Boast et al. ..................... | 210/335 |
| 6,328,065 B1 | * | 12/2001 | Schmid et al. ............ | 137/596.17 |
| 6,895,999 B2 | * | 5/2005 | Fleischer et al. ......... | 137/596.17 |
| 6,904,934 B2 | * | 6/2005 | Runge et al. ............. | 137/596.17 |
| 6,966,338 B2 | * | 11/2005 | Flynn et al. ............... | 137/625.65 |
| 7,516,756 B2 | * | 4/2009 | Mayr et al. ................ | 137/596.17 |
| 7,650,906 B2 | * | 1/2010 | Nagasaki ................... | 137/596.17 |
| 7,766,040 B2 | * | 8/2010 | Bamber ..................... | 137/625.26 |
| 7,905,249 B2 | * | 3/2011 | Mayr et al. ................ | 137/596.17 |
| 2006/0162787 A1 | * | 7/2006 | Yeh ............................ | 137/596.17 |
| 2007/0023091 A1 | * | 2/2007 | Mayr et al. ................ | 137/625.26 |
| 2007/0068585 A1 | * | 3/2007 | Nagasaki ................... | 137/625.65 |
| 2007/0090314 A1 | * | 4/2007 | Van Der Wijngaart et al. | 251/11 |
| 2009/0065075 A1 | * | 3/2009 | Schmidt et al. ........... | 137/596.17 |

\* cited by examiner

*Primary Examiner* — John Rivell
*Assistant Examiner* — Minh Le
(74) *Attorney, Agent, or Firm* — Jacobson Holman PLLC

(57) ABSTRACT

A valve with an inlet and an outlet as well as a return. In the inlet a first screen is provided. This screen is designed sharp or short.

14 Claims, 2 Drawing Sheets

VALVE

FIELD OF THE INVENTION

The invention refers to a valve, in particular a pressure control valve, having an inlet, an outlet as well as a return, a first screen being arranged at the inlet, and the outlet being arranged between the first and a second screen.

BACKGROUND OF THE INVENTION

Before-mentioned valves are used in particular as pressure control valves for the control in gears in automatic gears. Known valves have, as a rule, several screens which are closed or released by sealing bodies. A solenoid acts for control purposes in a suitable manner on these sealing bodies. An important property of the known pressure controllers here is the pressure control characteristic line, that means the connection between the coil electricity running through the solenoid, and the controlled starting pressure. Another important characteristic of the known pressure control valves is the flow through the pressure control valve.

It is known that the flowing-through between the inlet and the outlet decreases with the falling operation temperature which is not desired. It has to be taken into consideration here that in the intended use the pressure control valves have to be used in a temperature range from −30° C. to +80° C., and the flowing-through should be constant, if possible, over the entire operation temperature interval, however, at least as high as possible.

However, with the known pressure control valves according to the state of the art it has been found that the flowing-through at −10° C. decreases to about 40% of the flow existing at a middle operation temperature of 60° C.

SUMMARY OF THE INVENTION

Coming from this state of the art it is an object of the invention to improve a valve as described in the beginning in that respect that its flowing-through is improved even with low temperatures compared with the solutions of the state of the art.

In order to solve this problem the invention comes from a valve, in particular from a pressure control valve as described in the beginning where it is suggested according to the invention that at least one screen, in particular the first screen, is designed sharp-edged or short.

The suggestion according to the invention effects that with low oil temperatures an increase of dynamics in the hydraulic gear control occurs compared with the state of the art. By means of the suggestion according to the invention the reduction of the flowing-through is moderated, the flowing-through at −10° C. is, according to the invention, about 40% more than with the solutions according to the state of the art.

The flowing-through behaviour can be reached by a design of the first screen, which is also called pre-screen, as short and sharp-edged as possible.

As a screen in the sense of the invention here a flowing-through narrowing has to be seen which has, in contrast to a throttle, a clearly shorter throttle length.

In contrast to the known screen arrangements it is, according to the invention, suggested that the screen is designed sharp-edged or short. In order to reach the effect according to the invention the special design of the screen has to be kept in mind, an opening in the screen carrier being the screen here. Exactly the limiting surfaces of this opening are accordingly important here.

In a preferred modification of the invention it is provided that the ratio of screen length to screen diameter is less than 40%, in particular less than 30%. The smaller the screen length relative to the screen diameter, the better the advantageous effect at low temperatures of the medium to be controlled (here e.g. oil). Experiments have been carried out with screens the ratio of which of screen length to screen diameter is in particular less than 20%. With this ratio a considerable increase of the flowing-through with low temperatures has been noticed.

The sharp-edged or short design of the screen is reached according to the material of the screen carrier in different ways.

Thus it is, for example, known to provide relatively thin-walled screen carriers (this is about screen thickness of a few tenths of millimeters) where it is then sufficient that a cylinder-shaped opening, that means with parallel surface area lines, is arranged. Because of sufficient stability, but also for wearing reasons such a thin-walled screen carrier is preferably made of metal. However, the invention is in no way restricted to that.

It is also possible to provide a truncated or cone-like opening in the screen carrier where then the narrowest area of the opening is called screen. By means of such a design it is possible to form the screen carrier from basically thicker material, and only to provide a suitable taper in the area of the opening. The truncated or cone-like design has the effect that actually the result is a very short length of the screen, this area being then defined, if necessary, again by a (almost) cylinder-like opening. It is, of course, also possible to design the entire interior wall of the opening as truncated cone or cone in order to try to get in this way a sharp-angled transition between the interior surface of the cone and the side face of the screen carrier.

Such a truncated or cone-like design of the opening in the screen carrier makes it possible that the screen carrier is formed essentially also from synthetic material, if necessary also from fiber reinforced synthetic material, and in particular in the area of the opening of the screen has sufficient capacity of resistance to wear.

In the design of the screen carrier several modifications are possible. First of all, it is suggested, according to the invention, that the screen carrier is designed disc-like or as a disc, and, for example, is realized as a separate structural component, and is set in, welded in or glued in as a separate structural component in the valve housing. With such a design it is possible that the screen carrier consists of another material than the valve housing.

However, it is also possible that the screen carrier is designed in one piece with the valve housing of the valve. Usually the valve housing of the valve is manufactured, for example, in an injection molding process through which it is possible that the screen carrier is designed in one piece with the valve housing.

Cleverly here the valve housing (and thus also the screen carrier) is made of synthetic material. It is also possible that housing and, in particular, the screen carrier consist of fiber reinforced synthetic material. By means of the fiber reinforced synthetic material just at the screen carrier or the screen a higher capacity of resistance to wear is the result in this area. However, it is also possible that the screen carrier is also designed as a separate structural component of fiber reinforced synthetic material, and this element is then set in, welded in or glued in in the valve housing. By means of a welding process, for example, a screen carrier made of fiber reinforced synthetic material can be joined with the valve housing formed only from the same synthetic material in a mechanically reliable way.

Besides the design of the screen carrier of synthetic material or fiber reinforced synthetic material, however, also a realization of the screen carrier of metal, for example as metal disc or very thin metal disc is provided according to the invention. The use of metal is in particular convenient because of the high capacity of resistance to wear of this material. Here, for example, different steel alloys can be used.

In a preferred modification of the invention it is provided that the screen carrier is set in, welded in or glued in in the valve housing, or the screen carrier is surrounded by the injected material of the valve housing or is embedded in it. Such a construction is provided, for example, in such modifications where, according to the invention, the screen carrier is designed as a metal disc. In such a multi-piece embodiment of the valve housing or the valve according to the invention the screen carrier is surrounded by the injected material of the valve housing or embedded in it. By means of that the screen carrier is fastened sufficiently in the valve housing. For a suitable anchoring of the screen carrier in the valve housing in the screen carrier fastening openings are provided in which the material of the valve housing penetrates, for example synthetic material or metal, and thus produces an additional connection and support.

The arrangement of a separate screen carrier in the valve housing, however, is not restricted to the modification of a screen carrier made of metal. The above mentioned is provided, according to the invention, in the same way also for screen carriers made of synthetic material or fiber-reinforced synthetic material, and of other materials.

The valve housing is produced, for example, of synthetic material, but also, for example, of metal.

In valves according to the invention it is provided that at least one screen interacts with a sealing body, the position of this sealing body being controlled by a solenoid. Therefore a simple connection between the flow of electricity and a controlled pressure can be produced. Convenient is there a connection, as linear as possible, of the connected electricity and the resulting controlled pressure across a wide control range. By means of the design according to the invention it is achieved here that across a wider temperature range a flowing-through exists as high or constant as possible between the inlet and the outlet.

Concerning the preferred application according to the invention it has been found that the screen diameter of at least the first screen, the so-called pre-screen, is less than 2 mm. It is, in particular, suggested that the screen diameter is less than 1.5 mm, already a considerable increase of flowing-through at low temperature being recognized with the typical screen lengths of a few tenths of millimeters. A preferred modification of the invention therefore provides a screen diameter of about 1.2 mm.

The invention does not only comprise a valve as described in the beginning, but comprises in the same way also a gear, for example an automatic gear or a gear control, in particular of automatic gears in vehicles equipped with a corresponding pressure control valve as described. As actually the vehicles are to be used in a large temperature interval, by means of the suggestion according to the invention just the dynamic reaction behaviour of the gear control or the gear is improved with lower temperatures as by the suggestion according to the invention a reduction of dynamics in the hydraulic gear control at low temperatures is moderated or reduced.

BRIEF DESCRIPTION OF THE DRAWINGS

In the drawing the invention is shown schematically.
In the drawing.

DETAILED DESCRIPTION OF THE PREFERRED EMBODIMENTS

Figure 1:
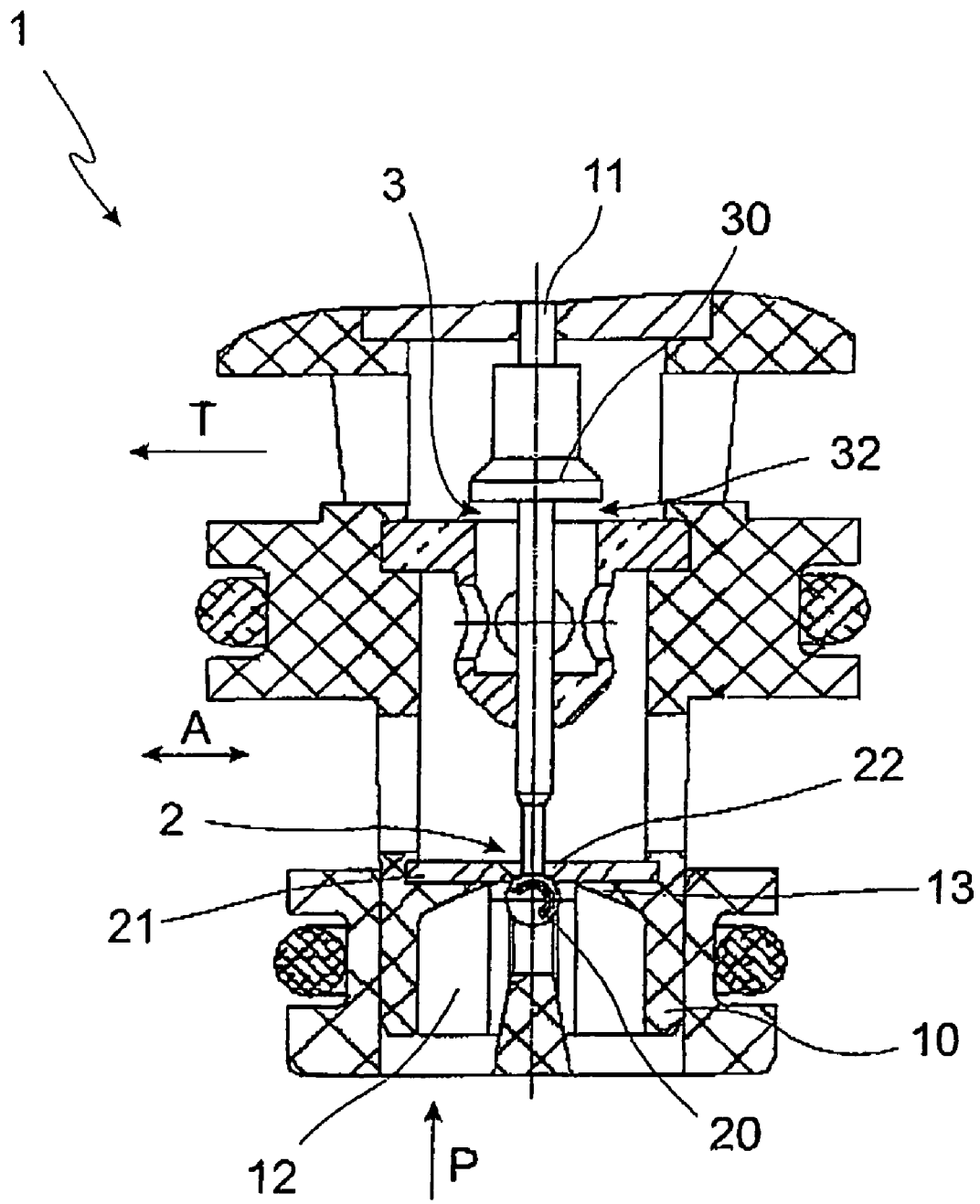
FIGS. 1, 2 show section views of two different embodiments of the valve according to the invention.

In FIG. 1 a first modification of the valve 1 according to the invention is shown schematically. For clearness reasons the solenoid controlling and regulating the valve is not shown. Only the armature rod 11 driven by the solenoid, which is supported reliably in the solenoid, is indicated. The medium flow to be controlled by the valve flows into the valve 1 at inlet P, flows through (when the position of the valve is open) the first screen 2 and leaves the valve 1 again at outlet A.

Outlet A is therefore located here behind the first screen 2. In the embodiment shown here also a second screen 3 is provided to which then the return T is connected.

The way of acting of the valves 1, known, according to the invention, known as pressure control, for gear controls is based on the interaction of the first screen 2 realized as a fixed pre-screen, and a variable control screen realized in this example as second screen 3. The first screen 2 or the fixed pre-screen is responsible for the flowing-through of the pressure control valve 1. The media flow entering through the inlet P therefore leaves the valve again to a certain part also through the return T, the return T being in connection with a suitable reservoir (not shown) which may also supply the inlet P.

Valve 1 is added in a suitable way to the solenoid (not shown). Valve 1 comprises essentially a valve housing 10 which receives the different lines. It is not absolutely necessary for the armature rod 11 to be supported in the valve 1, these support tasks are carried out by the solenoid. The armature rod 11 carries sealing bodies 30, or acts on suitable sealing bodies 20.

The sealing body 30 is located at the second screen 3 which is also referred to as variable control screen. It controls the flowing-through in the return T. The sealing body 30 at the second screen 3 is designed, for example, as disc or flange, and covers the corresponding opening 32 of the second screen 3. The sealing body 30 is sits fixedly on the armature rod 11.

Valve 1 has in the inlet P a cage 12 in which the sealing body 20, here designed as ball, is supported. The sealing body 20 is pushed away from the first screen 2 or its opening 22 by the movement of the armature rod 11 (here downwards). The medium pressure tries to push back the sealing body 20 again to the seat of the opening 22. This sealing body 20 is manufactured separately from the armature rod 11.

In FIG. 1 the first screen 2 is realised in a screen carrier 21 designed separately from the valve housing 10, that means a separated component.

The screen carrier 21 is here, for example, designed as disc and has a cone-like or truncated opening 22. The narrower area of the opening 22 faces here the area of the inlet P, and is closed on demand by ball-like sealing bodies 20. The front tip of the armature rod 11 projects through the opening 22 in order to act on the sealing body 20.

Figure 2:
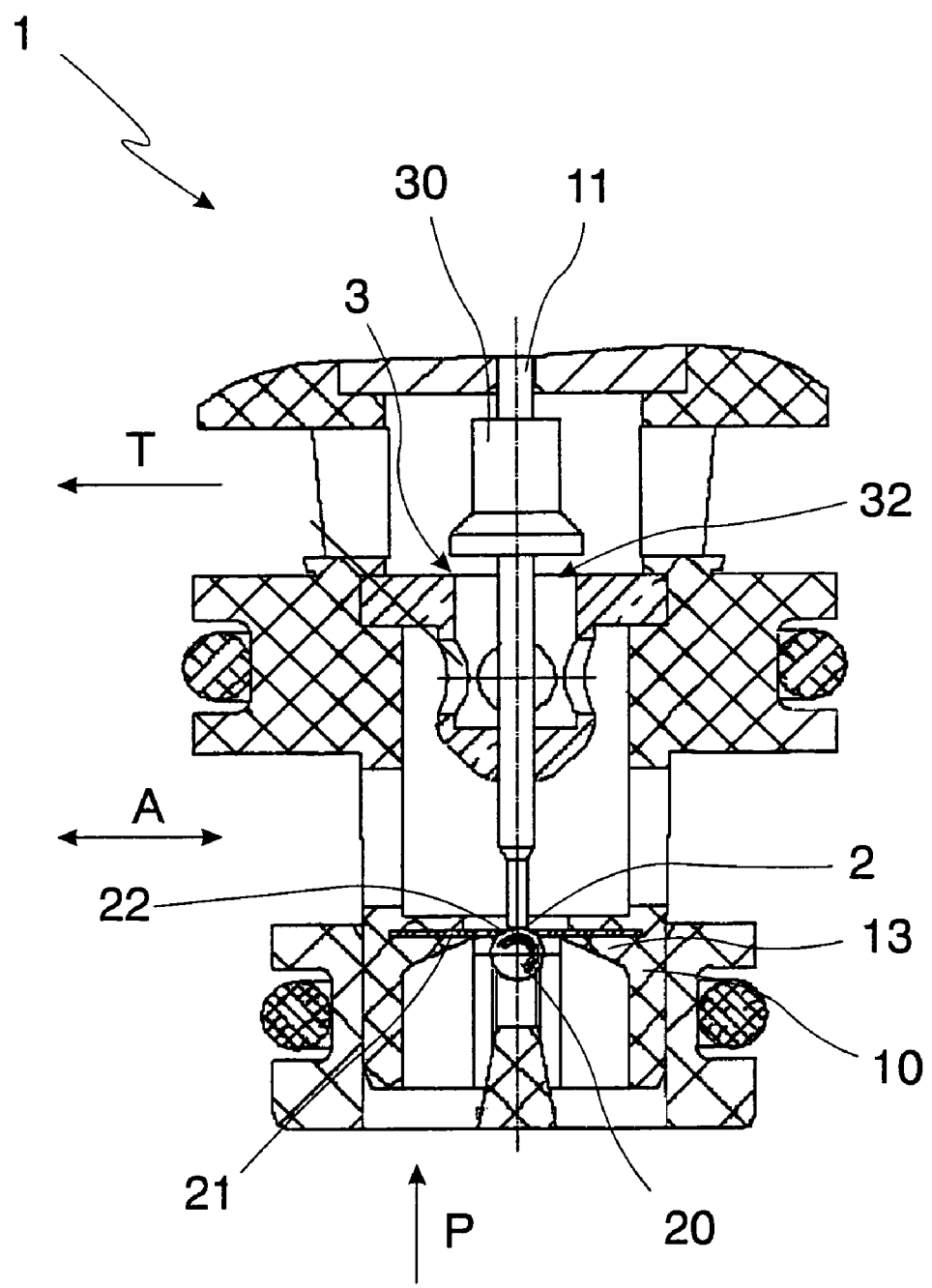

The thickness of the screen carrier 21 shown here is relatively large, in particular when compared with the modification of FIG. 2 shown according to the invention in a similar scale. In order to set the effect of the invention here the cone-like opening 22 is provided which leads to the convenient flow behaviour just with low temperatures of the medium to be controlled.

The screen carrier 21 is designed as structural component separated from the valve housing 10. It is built-in in the valve housing 10, consisting for example of synthetic material, in such a way that it is welded with it, glued to it or set-in in it. It is also possible that the marginal region of the screen carrier 21 is surrounded during the injection process of the valve housing 10 by the liquid synthetic material penetrating the mold, and thus a stable connection of the screen carrier 21 is reached with the valve housing 10.

The first screen 2 shown in FIG. 1 is realised, for example, in a screen carrier 21 made of synthetic material. The same synthetic material can be used as for the valve housing 10. However, the invention is free in the respective combination of materials.

FIG. 2 shows the same basic construction of the valve 1 as FIG. 1. In the example shown in FIG. 2 the first screen 2 consists of a screen carrier 21 which is much thinner than the one shown in the example in FIG. 1. Cleverly this is here a metal disc as thin as possible, which, however, still has sufficient stability and wear qualities. This could be, for example, suitable steel alloys. As, according to the invention, it has been found that a screen designed as sharp-edged as possible improves the effect accordingly it is striven for that the length of the screen of screen 2 is as short as possible. When the modification of FIG. 2 according to the invention is compared with the one of FIG. 1 the clearly smaller thickness of the screen carrier 21 is obvious. In this embodiment already with an opening 22 essentially cylinder-shaped the effect according to the invention can be reached, however, it is possible to provide also with such a modification, where the thickness of the screen carrier is only 0.1 to 0.3 mm, a cone-like or truncated opening 22.

It has to be taken into consideration here that the narrowest area of the opening 22 defines the properties of the screen, in particular the flowing-through behaviour and the flow speed as well as the kind of flow forming in the screen.

In both examples according to FIG. 1 the valve housing has on its side of the first screen 2 facing the inlet P a flange 13 which serves as support for the set-in screen carrier 21. The screen carrier 21 according to FIG. 2 is here on both sides in a much larger area surrounded by the material of the valve housing 10 in order to reach a correspondingly stable support of the comparatively thin screen carrier 21. In the inlet direction here the flange 13 tapers funnel-like, in order to have the "lowest point" of the funnel in the area of screen 2.

The claims filed with the application now and to be filed later on are attempted formulations without prejudice for obtaining a broader protection.

If here, on closer examination, in particular also of the relevant prior art it turns out that one or the other feature may be convenient for the object of the invention, however, not decisively important, of course, already now a formulation is striven for which does not contain anymore such a feature, in particular in the main claim.

Furthermore it has to be taken into consideration that the embodiments and modifications of the invention described in the different examples and shown in the figures can be combined with each other in any way. Here single or several characteristics can be exchanged in any way. These combinations of characteristics are also disclosed.

References in the sub-claims relate to the further design of the matter of the main claim through the characteristics of the respective sub-claim. These are, however, not to be understood as a waiver of independent protection of the matter for the characteristics of the referred sub-claims.

Characteristics only disclosed in the description so far may now, in the course of proceedings, be claimed as being of inventive relevance, for example to distinguish from the state of the art.

Characteristics only disclosed in the description or even single characteristics from claims which comprise a variety of characteristics may be used at any time to distinguish from the state of the art in the first claim, and this is even if such characteristics have been mentioned in connection with other characteristics, or achieve particularly convenient results in connection with other characteristics, respectively.

The invention claimed is:

1. A pressure control valve comprising
an inlet,
an outlet,
a return,
a first screen arranged at the inlet,
the outlet being located between the first screen and a second screen,
the first screen being sharp-edged or short, and
a thin-walled screen carrier being designed as a disc,
the first screen having in the thin-walled screen carrier at least a partial cone shaped opening with tapering walls of the at least partial cone shaped opening extending continuously outwardly throughout a thickness of the first screen in a direction away from the inlet.

2. The pressure valve according to claim 1, wherein a ratio of length of the screen to diameter of the screen is less than 40%.

3. The pressure valve according to claim 1, wherein the thin-walled screen carrier is one piece with a valve housing.

4. The pressure valve according to claim 1, further comprising a valve housing made of synthetic material.

5. The pressure valve according to claim 1, further comprising a valve housing made of fiber reinforced synthetic material.

6. The pressure valve according to claim 1, wherein the thin-walled screen carrier consists of fiber reinforced synthetic material.

7. The pressure valve according to claim 1, wherein the thin-walled screen carrier consists of metal.

8. The pressure valve according to claim 1, wherein the thin-walled screen carrier is set in, welded in or glued in a valve housing, or the screen carrier is surrounded by injected material of a valve housing.

9. The pressure valve according to claim 1, wherein the first screen interacts with a sealing body a position of which to the first screen is controlled by a solenoid.

10. The pressure valve according to claim 1, wherein a screen diameter of at least the first screen is less than 2 mm.

11. The pressure valve according to claim 2, wherein a ratio of length of the screen to diameter of the screen is less than 30%.

12. The pressure valve according to claim 11, wherein a ratio of length of the screen to diameter of the screen is less than 20%.

13. The pressure valve according to claim 10, wherein a screen diameter of at least the first screen is less than 1.5 mm.

14. The pressure valve according to claim 13, wherein a screen diameter of at least the first screen is less than 1.2 mm.

* * * * *